Nov. 18, 1947.                O. ALLEN                2,430,852
                          GASOLINE VAPORIZER
                        Filed March 1, 1945          3 Sheets-Sheet 1

Inventor
Otis Allen
By Clarence A. O'Brien
and Harvey B. Jacobson
Attorneys

Nov. 18, 1947.　　　　O. ALLEN　　　　2,430,852
GASOLINE VAPORIZER
Filed March 1, 1945　　　3 Sheets-Sheet 2
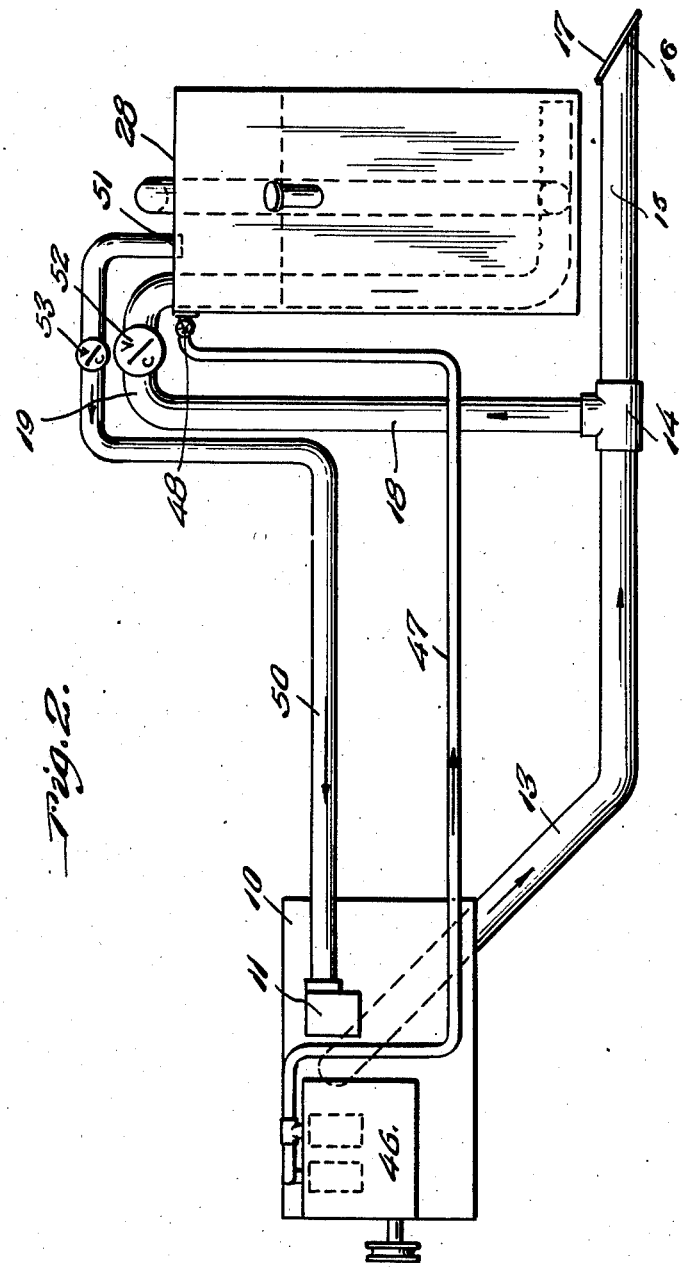

Nov. 18, 1947.  O. ALLEN  2,430,852
GASOLINE VAPORIZER
Filed March 1, 1945   3 Sheets-Sheet 3
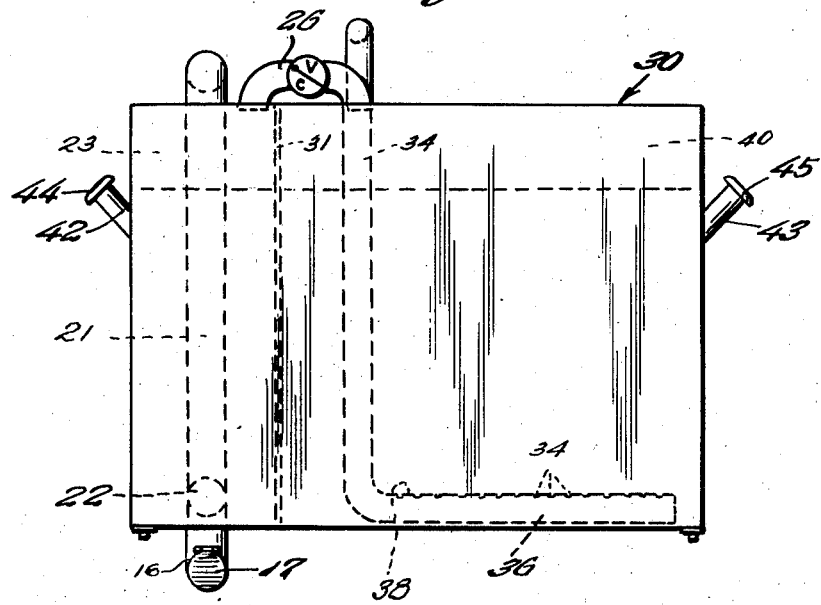
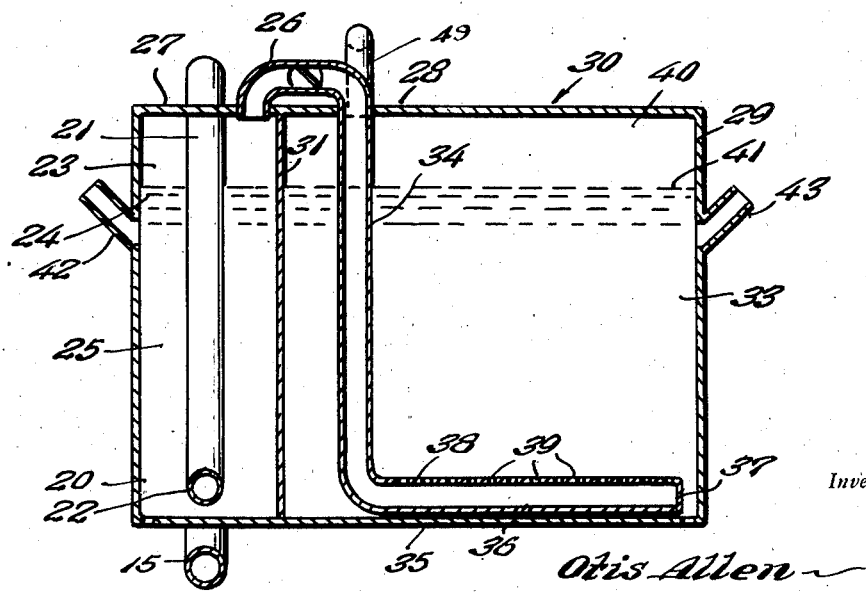
Inventor
Otis Allen
By Clarence A. O'Brien
and Harvey B. Jacobson
Attorneys Patented Nov. 18, 1947

2,430,852

UNITED STATES PATENT OFFICE 2,430,852

GASOLINE VAPORIZER

Otis Allen, El Paso, Tex.

Application March 1, 1945, Serial No. 580,448

2 Claims. (Cl. 123—25)

This invention relates to internal combustion engines and has for an object to provide means whereby the efficiency of such an engine is greatly enhanced due to the fact that only dry vapor or gas is fed into the combustion chambers thereof, resulting in perfect combustion, eliminating excessive heat, requiring less radiator surface; eliminates the use of a motor carburetor; produces no carbon, thereby reduces the consumption of lubricating oil in the engine, obviating carbonization of valves, etc.

Another object of the invention is to provide in connection with an internal combustion engine means whereby the exhaust from the engine is utilized to vaporize the fuel used in the engine.

A further object of the invention is to provide in combination with an internal combustion engine means whereby the exhaust products of combustion of the engine are thoroughly washed and then passed through a body of gasoline to vaporize the same.

A still further object of the invention is to provide a method of vaporizing motor fuel which contemplates an endless passage of the gases thereof, both live and exhausted, through the motor.

Other features and advantages will become more readily apparent from the following description and the accompanying illustrative drawings in which:

Figure 2 is an elevational view thereof,

Figure 3 is an elevational view of a vaporizing tank taken on the line 3—3 of Figure 1.

Figure 4 is a vertical sectional view thereof taken on line 4—4 of Figure 1.

Figure 1:
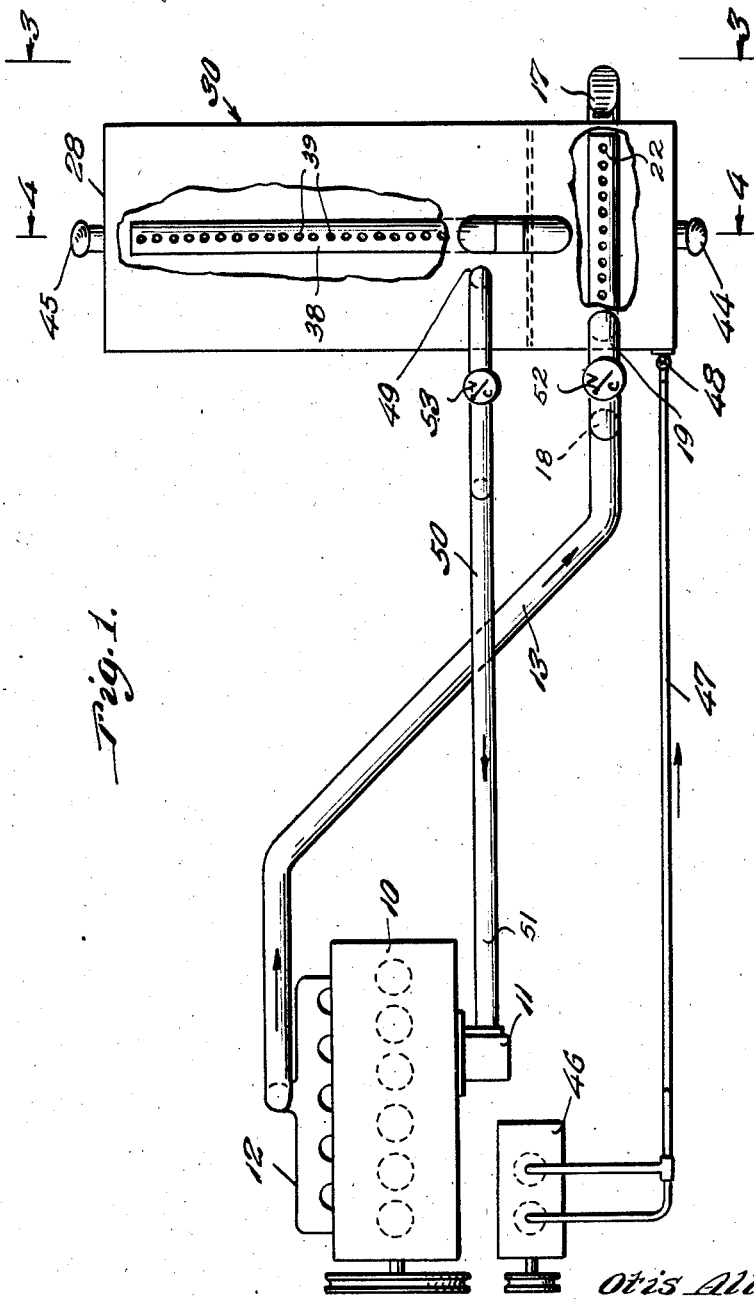
Figure 1 is a plan view illustrating my invention.

In the accompanying drawings illustrating one set-up of my invention and in the following specification the same reference characters refer to the same parts throughout and in which 10, indicates an internal combustion motor provided with an intake manifold 11, and an exhaust manifold 12, and from the latter an exhaust pipe 13, extends to a connection 14, and continues through a terminal 15, the outlet 16, of which is provided with a counterweighted controlled closure 17, which may be adjusted to permit the passage of a part, or none, of the exhaust products as conditions required.

From the T-connection 14, a branch pipe 18, is extended, through a goose neck portion 19, down through a water tank 20, as at 21, and has its outlet 22, terminal at the bottom of the tank, whereby the exhausted hot products of combustion are cleansed of any possible solids and any blaze or spark eliminated, leaving only pure gas to arise into the dry gas chamber 23, above the water line 24, of the tank 20. The passage of pipe 21, through the body of water 25, in said tank and the highly heated exhaust from said pipe 21, will heat the water to a high temperature and the expansion produced thereby will cause the mixture of the gas and steam to be forced through the pipe 26, entering top wall 27, of the tank 20.

The pipe 26, turns and runs through the top wall 28, of a gasoline tank 29, which is provided in the same air tight housing 30, as is tank 20, but separated therefrom by a division wall 31, and extends vertically through the volume of gasoline 33, as at 34, and turns at the bottom wall 35, of the latter tank and extends horizontally along said wall 35, as at 36. The terminal 37, of the pipe is closed but the upper wall 38, thereof is provided with a series of bores 39, which taken as a whole equals the diameter of the pipe. The hot vapor issuing from these perforations rises through the body of said gasoline (or any other fuel oil substituted in lieu thereof), vaporizes the gasoline into a gaseous state and fills the gas chamber 40, above the liquid line 41. The volume of liquid in either tank 20, or 30, can not rise above the lines 24 and 41, due to the positions of the filling spouts 42 and 43, which must be provided with air tight closures 44 and 45, removable only for filling purposes at such times as there is no pressure in the tanks.

A pump 46, driven by motor 10, forces atmospheric air through a pipe line 47, controlled by a check valve 48, into the chamber 23, in order that a sufficient quantity of air may be added to the vapor in said chamber that a perfect combustible gas will be formed in the chamber 40.

Also entering the top wall 28, of chamber 40, is one end 49, of a pipe 50, which connects at 51, to the intake 11. A check valve 52, is provided in pipe 18, and a check valve 53, is provided in pipe 50.

It is obvious that the pipe 47, may be extended into the water in tank 20, in order to eliminate any dust or other foreign matter from the air passing therethrough which may have passed a filter in the pump.

From the foregoing it will be seen that the exhaust gases go through pipe 13, to bottom of water tank 20, thence up into chamber 23, where they mix with steam generated in tank 20, and air pumped in through pipe 47, from thence the mixture is driven through pipes 26 and 34, into pipe 38, and out through perforations 39, they then ascend through the gasoline to chamber 40, mixing thoroughly with sufficient gasoline to finally produce a perfect combustible vapor or gas in the chamber 40, and being under pressure from the steam and heated gasoline are forced through pipe line 50, to intake manifold 11, then fed to the combustion chamber in the motor 10, exploded therein and the products of the explosion forced through manifold 12, when the cycle begins again and continues as long as the motor is running. The initial start of the motor is accomplished in the usual way, through a small gasoline pump actuated by the accelerator of a motor car, or other machine to which my invention is connected and which is no part of this invention.

I have constructed this device and am using it in my own car and find that it saves from 25% to 35% of gasoline for its operation and is more satisfactory in every way than the present method of operation.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a device as described a water tank, a gasoline tank, an exhaust pipe from a motor entering said water tank and exhausting into the water therein, means connecting the two tanks and means connecting the gasoline tank with the intake manifold of the motor, means for forcing atmospheric air under pressure into the water tank, and means for limiting the amount of liquid in both of said tanks.

2. In a device as described a water tank, a gasoline tank, an exhaust pipe from a motor entering said water tank and exhausting into the water therein, means connecting the two tanks and means connecting the gasoline tank with the intake manifold of the motor, and means for forcing atmospheric air under pressure into the water tank.

OTIS ALLEN.

REFERENCES CITED

The following references are of record in the file of this patent:

UNITED STATES PATENTS

| Number | Name | Date |
|---|---|---|
| 1,138,581 | Shumaker | May 4, 1915 |
| 1,296,115 | Pfeifer | Mar. 4, 1919 |
| 1,296,116 | Pfeifer | Mar. 4, 1919 |
| 1,992,265 | Weeks | Feb. 26, 1935 |
| 1,992,266 | Weeks | Feb. 26, 1935 |
| 2,161,409 | Dalton | June 6, 1939 |